United States Patent [19]

Haddock, deceased

[11] 4,034,337
[45] July 5, 1977

[54] VEHICLE ALARM APPARATUS

[75] Inventor: Don E. Haddock, deceased, late of North Augusta, S.C., by Joan L. Haddock, administratrix

[73] Assignee: Electronic Devices, Inc., Augusta, Ga.

[22] Filed: Sept. 9, 1975

[21] Appl. No.: 611,667

[52] U.S. Cl. .............................. 340/63; 307/10 AT; 200/61.7

[51] Int. Cl.$^2$ ................ B60R 25/10; H01H 53/06

[58] Field of Search .......... 340/63, 64; 307/10 AT; 180/114; 200/61.7, 61.93, 81.9 M

[56] References Cited

UNITED STATES PATENTS

| | | | |
|---|---|---|---|
| 3,422,398 | 1/1969 | Rubin | 340/63 |
| 3,549,839 | 12/1970 | Hill et al. | 200/81.9 |
| 3,636,485 | 1/1972 | Weathers | 335/205 |
| 3,805,231 | 4/1974 | Santoli | 340/63 |
| 3,873,966 | 3/1975 | Tanner | 340/63 |
| 3,896,404 | 7/1975 | Peterson | 335/205 |
| 3,924,086 | 12/1975 | Ochsner | 200/82 R |
| 3,930,226 | 12/1975 | Plumberg | 340/64 |
| 3,938,079 | 2/1976 | Croisier | 340/64 |

Primary Examiner—John W. Caldwell
Assistant Examiner—Joseph E. Nowicki

[57] ABSTRACT

Vehicle alarm apparatus including a control circuit for energizing the horn of the vehicle upon the unauthorized tampering with selected parts of the vehicle. A reed switch is mounted adjacent the gas tank fill pipe so as to be operated by a magnet mounted in movable relation thereto, as, for example, on the closure door for the fill pipe, and a control circuit is provided which has a plurality of connecting points, each of which can be connected to a variety of existing circuits of selected electrical components of the vehicle including the reed switch circuit. The control circuit is capable of energizing the horn of the vehicle in response to a predetermined change of condition in such circuits, even where the predetermined changes of the circuit conditions for the various circuits are dissimilar.

3 Claims, 6 Drawing Figures

VEHICLE ALARM APPARATUS

BACKGROUND OF THE INVENTION

A variety of alarm devices have heretofore been proposed for use in vehicles to indicate when the vehicle has been entered by unauthorized persons and/or when selected components of the vehicle are being tampered with, a representative sampling of such circuits being generally described at pages 82–83 of "Guidebook of Electronic Circuits" (1st Ed., 1974) and in an article appearing at page 32 of "Popular Electronics" magazine, January 1973 issue.

While these prior art alarm circuits are generally operable to sound an alarm, usually the horn of vehicle, when predetermined electrical circuits of the vehicle are energized (i.e. the ignition switch circuit), they have certain drawbacks. Many of these prior art circuits ae designed to be connected with, and operated by, only one particular element or circuit of the vehicle, whereby tampering with other components or parts of the vehicle would go undetected. For example, an alarm circuit such as that entitled Door-Switch Alarm at page 83 of the aforementioned "Guidebook of Electronic Circuits" is only activated when one of the dome light door switches of a vehicle is closed, but a thief may nevertheless enter the vehicle through a back door thereof which normally does not have a dome light door switch, or the thief may tamper with other parts of the vehicle without entering the vehicle (i.e., the gas tank), all without detection.

To avoid the drawbacks of single alarm triggering components, other known alarm circuits have been devised which are responsive to the energization of any one of a plurality of existing electrical components within the vehicle, such as the trunk light, the ignition switch and the headlamps. Such multitriggered alarm circuits are nevertheless always operable in response to exactly the same condition occurring in one or more of the different electrical components to which the circuit is connected. For example, such a circuit may be triggered when the 12-volt vehicle voltage is applied to any one of the selected triggering components, as would be the case when such components are activated by the existing switch therefor in the vehicle. However, as a practical matter, the operation and accessibility of the existing circuits of different components in vehicles makes it difficult if not impossible to conveniently connect an auxiliary alarm circuit to all such existing circuits. For example, it may be convenient to connect the alarm circuit to the existing ignition switch of the vehicle at a point where the alarm will be triggered when the ignition switch is closed and 12 volts is applied to the alarm circuit, whereas it may be convenient to connect the alarm circuit to the existing dome light door switch at a point where the alarm will be triggered when the door switch is closed and the alarm circuit is connected to ground. Thus, known alarm circuits which are responsive to only one trigger circuit condition that must be present upon the actuation of any one of a plurality of different components are not compatible, as a practical matter, with existing vehicle wiring circuits.

Finally, the rapidly rising cost of gasoline has resulted in a corresponding rise in incidents of gasoline thefts from the gasoline tanks of vehicles, even where attempts have been made to secure such gasoline tanks by locked gasoline fill tank caps and the like. Electrical alarm circuits for gas tanks, while obviously being desirable, have heretofore encountered two significant difficulties. First, there are generally no existing electrical components located at the gas tank fill pipe which can act to trigger an alarm circuit, and, secondly, if a conventional electrical vehicle switch is mounted at the gas tank fill pipe, for triggering an alarm circuit, there is an ever present danger that the volatile gasoline fumes inherently associated with the gas tank will be accidentally ignited by the electric circuit of such conventional switch.

SUMMARY OF THE INVENTION

The present invention provides an alarm device which is inexpensive to produce, and which is easy to install in existing vehicle circuits by ordinary persons having no particular electrical skills. Additionally, the alarm device of the present invention may be connected to a large number of different electrical components usually found in vehicles whereby any one of such electrical components can serve to trigger the alarm, and such connections may be easily made at readily accessible points within the existing circuits of such electrical components even though the electrical conditions of such circuits which act to trigger the alarm circuit may be entirely different from one another. The alarm device of the present invention also provides a unique switch and circuit arrangement which can be easily installed at the gas tank fill pipe, and which is extremely safe and reliable.

More specifically, the present invention provides alarm apparatus that is particularly designed for installation as an accessory in vehicles presently in use, and that causes an alarm, such as the horns of such vehicles, to be energized under certain predetermined conditions of selected existing electrical components in such vehicles. This alarm apparatus includes a unit having a plurality of connecting points, one of which is adapted to be connected to the horn circuit of the vehicle, and the remainder of which are adapted to be connected to the circuits of the aforesaid electrical components. The unit includes a simple and inexpensive electronic circuit which is triggered by predetermined changes in the electrical state of the component circuits to energize the horn of the vehicle, and such predetermined changes which trigger the horn may be different at different connecting points whereby the alarm unit is compatible with a variety of electrical conditions within the existing circuits of the vehicle.

One or more of the aforesaid connecting points may be connected to an existing circuit (e.g. the ignition switch circuit) at a point therein where the operation of such circuit will impose the voltages potential of the vehicle battery on the control circuit to thereby complete an operating circuit from the battery of the vehicle to the horn. Another of the connecting points may be connected to another existing circuit (e.g. the grounded casing for the radio or tape deck within the vehicle) at a point therein where the breaking or opening of such circuit will trigger the alarm control circuit to energize the vehicle horn. Still another of the connecting points may be connected to another existing circuit (e.g. dome light circuit) at a convenient point therein where operation of such circuit will connect such connecting point to ground and thereby trigger the alarm control circuit. Thus, connecting points are provided for connection to a variety of existing component circuits, each of which triggers the alarm circuit in response to a different electrical condition within such existing component circuits, whereby the alarm unit is compatible with existing electrical wiring in a vehicle.

The present invention also provides a unique alarm circuit triggering switching arrangement which is particularly adaptable for use at the gas tank fill pipe of a vehicle. This switch arrangement includes a reed switch which is mounted at a stationary position on or adjacent the fill pipe and which is connected to one of the aforesaid connecting points of an alarm control circuit. The reed switch includes movable contacts, and a magnet is mounted on a movable cover member (e.g. the gas tank cap or the closure door of the vehicle) adjacent the fill pipe so as to open and close the reed switch contacts when the cover member is opened and closed, respectively, to cause the alarm control circuit to energize the vehicle horn when the cover member is opened. Since the reed switch contacts are normally surrounded by a glass envelope with exposed connecting wires extending therefrom, the reed switch of the present invention is preferably completely contained within a non-magnetic epoxy resin casing that protects not only the glass envelope but all the exposed connections thereof whereby the reed switch circuit is completely insulated from any volatile fumes which may be around the fill pipe. Additionally, the reed switch casing may include an inner layer of relatively soft epoxy resin material around the glass envelope to protect it against breakage under thermal stresses and shock loads, and a relatively hard epoxy resin material forms the outer layer of the casing to provide a sturdy unit which can be readily mounted at the fill pipe wall.

Finally, the glass envelope is located in the casing so as to be substantially spaced from the metal wall on which it is mounted whereby the field of the operating magnet will not be diverted from the contacts of the reed switch by any closely adjacent metal parts.

DESCRIPTION OF THE PREFERRED EMBODIMENT

Figure 1:
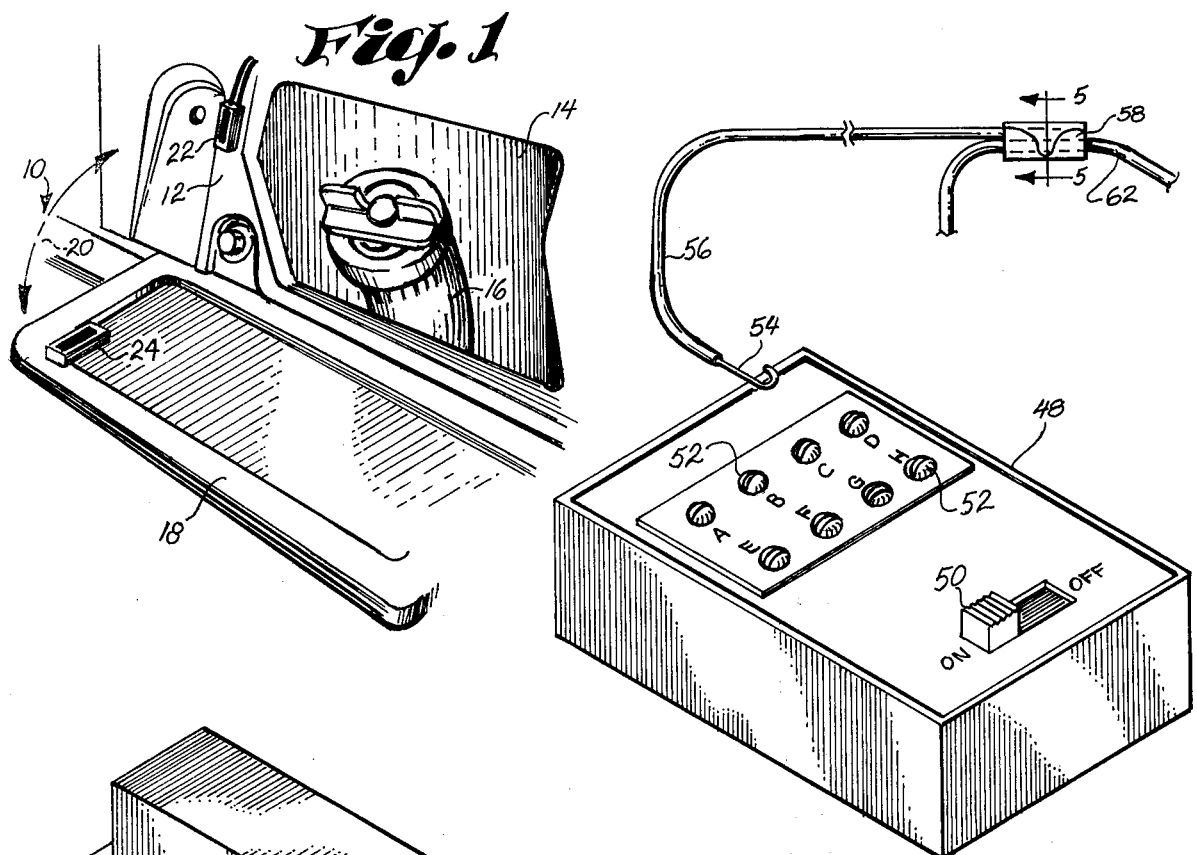
FIG. 1 illustrates the reed switch arrangement of the present invention mounted at the gasoline tank fill pipe of a vehicle.

Looking now in greater detail at the accompanying drawings, FIG. 1 illustrates a portion of a vehicle body 10 having a stationary wall 12 formed with an opening 14 therein at which the gasoline tank fill pipe 16 is exposed. A conventional closure door 18 is pivotally mounted on the stationary wall 12 adjacent the gasoline tank fill pipe 16 for pivotal movement, as indicated by the arrows 20. The closure door 18 is normally in its closed position flush with the exterior surface of the vehicle 10 to cover the opening 14, and it is normally pivoted to its open position as seen in FIG. 1 only when gasoline is added to the gasoline tank of the vehicle 10 through the fill pipe 16. It is to be noted also that if a thief attempts to steal gasoline from the vehicle, as by siphoning, the thief must also pivot the closure door 18 to its open position as shown in FIG. 1.

Figure 2:
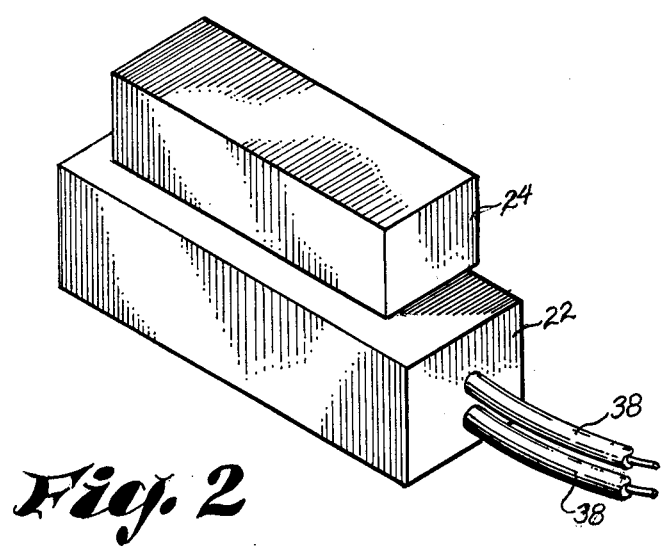
FIG. 2 is a perspective view of the reed switch unit and operating magnet.
Figure 3:
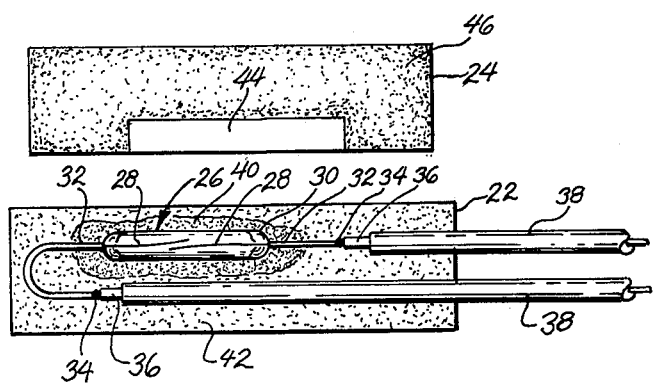
FIG. 3 is a section view taken through the longitudinal centerline of the reed switch unit and magnet shown in FIG. 2.

In accordance with the present invention, a unique switch unit 22 is mounted on the stationary wall 12, and a magnet unit 24 is mounted on the pivoted closure door 18. As best seen in FIGS. 2 and 3, the switch unit 22 includes a reed switch 26 having a pair of contacts 28 contained within a surrounding glass envelope 30. The contacts 28 each have an exposed connecting wire 32 extending respectively from the ends of the glass envelope 30 and joined at 34 by soldering or the like with the exposed ends 36 of two insulated electrical lines 38. The reed switch 26 and all exposed wire associated therewith are completely contained within a casing formed on non-magnetic, electrically insulating material, such casing including an inner layer 40 of relatively soft material surrounding the glass envelope 30, and an outer layer 42 of relatively hard material.

It has been found that excellent results are obtained if the inner layer 40 consists of a relatively soft epoxy resin plastic, such as RP-6400 manufactured by REN Plastics Company in Lansing, Michigan, and if the outer layer 42 consists of a relatively hard epoxy resin plastic, such as System 1475 manufactured by Amicon Corporation in Lexington, Massachusetts. Since the glass envelope 30 of the reed switch 26 is somewhat fragile, the relatively soft inner layer 40 provides a surrounding cushion for the glass envelope 30 to absorb the thermal stresses the normal shock loads which may be expected to be imposed on the reed switch unit 22 during and after its installation on the vehicle 10, and the relatively hard outer layer 42 provides a firm, durable covering for the reed switch unit 22 that can be readily attached in place at the stationary wall 12 by a suitable adhesive and that will withstand any blows or abuse which might be anticipated at its location near the fill pipe 16. Moreover, the inner layer 40 and outer layer 42 provides a non-magnetic casing which completely covers the glass envelopes 30 as well as all of the exposed wire ends 32 and 36 so that any electrical spark or heating thereat, generated during use, will be fully insulated from any volatile gas fumes which may be present at or around the fill pipe 16.

The magnet unit 24 includes a permanent base magnet 44 encased with a covering 46 formed of a relatively hard, non-magnetic epoxy resin plastic material similar to that of the outer layer 42 of the reed switch unit 22.

As best seen in FIG. 3, the reed switch contacts 28 are normally spaced apart so as to provide a break in the circuit between the two insulated electric lines 38. However, the magnet unit 24 is mounted on the closure door 18 at a location relative to the reed switch unit 26 which assures that when the closure door 18 is pivoted to its closed position, the permanent magnet 44 will be positioned within a predetermined distance of the reed switch 26 (e.g. ⅛ inch) to cause the magnetic field of the magnet 44 to impose a magnetic attraction on the reed switch contacts 28 whereby they will come together and close the circuit between the electric lines 38. Thus, when the closure door 18 is pivoted to its normal closed position, the contacts 28 will assume a first or closed circuit electrical state, and when the closure door 18 is pivoted to its open position as shown in FIG. 1, the contacts will assume a second or open circuit electrical state.

If desired, the reed switch unit 26 could be mounted directly on the gas tank fill pipe 16 and the magnet unit 24 could be mounted on the removable gas tank cap member 16'. Thus, whether the reed switch unit 26 is mounted on the stationary wall 12 on the fill pipe 16, it is stationary, and the magnet unit 24 is mounted on a movable cover member, either closure door 18 or cap 16', which, when moved to permit access to the gas tank fill pipe 16, will move the magnet unit 24 away from the reed switch unit 26.

Figure 4:
FIG. 4 is a perspective view of the alarm control box unit of the present invention.
Figure 5:
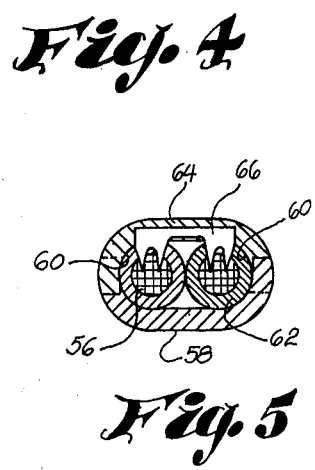
FIG. 5 is a detailed view taken through line 5—5 in FIG. 4.
Figure 6:
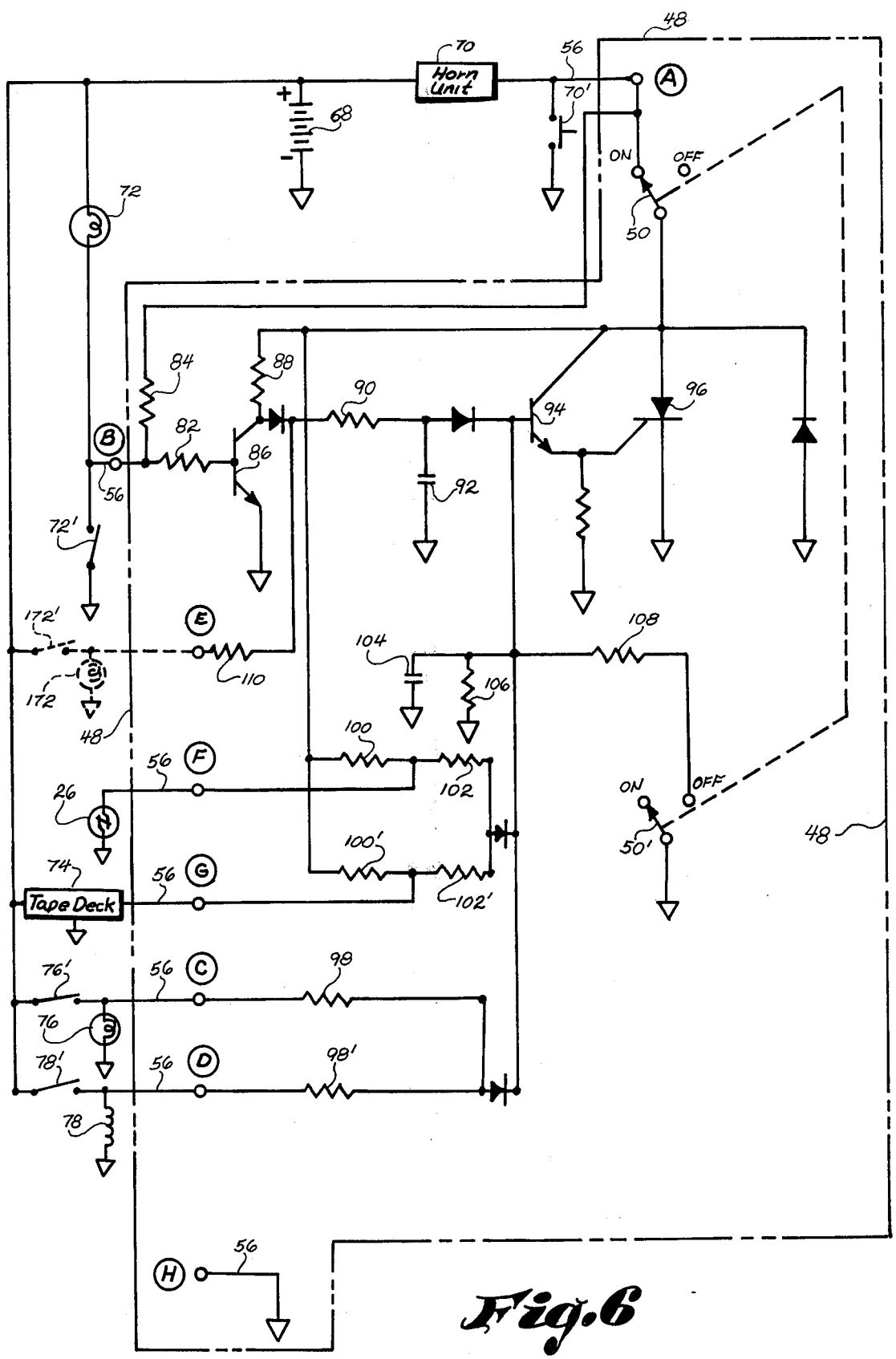
FIG. 6 is a wiring diagram of the alarm control circuit of the present invention.

The alarm control circuit for the present invention is shown in FIG. 6, such circuit being housed in a control box unit 48 (see FIG. 5) having an activating on-off switch 50 and a plurality of connecting posts 52, identified by letters A–H. Each of the posts 52 is adapted to engage the exposed end 54 of a connecting line 56 which extends therefrom. As will be explained in greater detail presently, the connecting lines 56 are connected to various electrical components or the circuits thereof, and when the alarm apparatus of the present invention is attached to existing vehicles as an accessory item rather than part of the original equipment thereof, it is desirable to provide a means for readily attaching the connecting lines 56 to the existing electrical lines in the vehicle rather than disconnecting a rewiring such existing electrical lines. Accordingly, as seen in FIGS. 4 and 5, a plastic clamp 58 is provided which has two longitudinally extending compartments 60 therein for receiving two insulated electrical lines such as a connecting line 56 and a typical insulated electrical line 62 forming part of the existing wiring system in the vehicle 10. The clamp 58 includes a pivoted band piece 64 and a metal bridging piece 66 which, when the band piece 64 is secured in place around the clamp 58, is forced to penetrate the insulation of both of the electrical lines 56 and 62 to electrically join such lines through the metal bridging piece 66.

The wiring diagram in FIG. 6 includes the control circuit contained within the aforesaid control box unit 48 (indicated by dot-dash lines in FIG. 6), and a typical existing electrical circuit for a vehicle including a battery 68, a horn unit 70 normally operated by horn switch 70', an interior or dome light 72 operated by one or more conventional door switches 72', a grounded tape deck 74, headlamps 76 operated by a switch 76', ignition coil 78 operated by ignition switch 78', and the aforementioned reed switch 26, all connected to a designated one of the connecting posts A–H by a connecting wire 56 as illustrated in FIG. 6.

Since, as indicated above, the control circuit of the present invention acts to cause the battery 68 to energize the horn unit 70 in response to three separate and distinct electrical conditions in the existing vehicle circuits, the explanation of the control circuit may be conveniently divided into three parts.

First, it is noted that the dome light 72 is connected at one side thereof directly to the positive terminal of the battery 68 and at the other side thereof to a conventional door switch 72' that is connected to ground. This is a conventional dome light circuit existing in most vehicles today, the door switch 72' being normally held open by the door of the vehicles and being closed when one of the vehicle doors is opened. A connecting wire 56 connects the connecting post B to the dome light circuit at a point between the dome light 72 and the dome light switch 72'. When the control circuit on-off switch 50 is activated to its "on" position by the vehicle operator just before leaving the vehicle unattended, the dome light circuit is in the condition shown in FIG. 6 with a circuit being completed from the battery 68, the dome light 72, connecting post B and resistor 82 to the base of an NPN transistor 86, it being noted that the resistor 82 has a sufficient resistance (e.g. 10K) to cause a voltage drop thereacross large enough to preclude the dome light 72 from being illuminated. This circuit through resistor 82 imposes a bias on the base of the NPN transistor 86 whereby a circuit is completed from the battery 68, the horn unit 70, activating switch 50, resistor 88, and transistor 86, to ground. Again, however, the resistance of resistor 88 (e.g. 10K) creates a voltage drop thereacross which is sufficient to prevent the horn unit 70 from being energized. Thus, in the normal condition of the dome light circuit, the horn unit 70 is not energized, and the current through the two completed circuits described above is very small and will not impose any significant drain on the battery 68. If, however, the door-operated dome light switch 72' is now closed, as would be the case if a thief opened the door of the vehicle 10, the current flow through the dome light 72 is, in effect, shorted to ground through closed switch 72' whereupon no further bias is imposed on the base of transistor 86 and it becomes non-conductive. Accordingly, the aforementioned current flowing through resistor 88 now flows through additional resistor 90 to charge capacitor 92, such charging of capacitor 92 resulting in a predetermined time delay in the operation of the alarm circuit. When the capacitor 92 is charged to a predetermined value, the emitter voltage of the transitor 94 will be raised to a sufficient value to trigger SCR 96. When SCR 96 is triggered, it becomes conductive and provides a direct circuit through the horn unit 70, on-off switch contact 50 and SCR 96 to ground whereby the horn unit 70 will be energized to sound an alarm. It should be noted that the aforementioned time delay caused by the charging of capacitor 92 is dependent upon the nature of the R-C circuit consisting of a capacitor 92 and resistors 88 and 90, and it has been determined that in a 12-volt battery system a capacitor of 3600 MFD and a total resistor value of 11K will provide a sufficient time delay (e.g. 15 seconds) to permit the owner or authorized occupant of the vehicle 10 to set the on-off switch 50 at its on position then open the vehicle door long enough to leave the vehicle 10 without the horn unit 70 being energized. Also, to prevent the horn unit 70 from being inadvertently triggered if the dome light 72 should burn out, a resistor 84 is connected in circuit between switch 50 and resistor 82 as shown in FIG. 6 whereby a back-up bias is always imposed on the base of transistor 86 (as long as switch 72' is open), regardless of whether dome light 72 is burned out or not. However, when switch 72' is closed, the circuit through resistor 84 is immediately grounded so as to remove the bias imposed by this circuit on the base of transistor 86 whereby the horn unit 70 will be energized as described above.

In some vehicles, the operating switch for the dome light is wired directly between the dome light and the battery rather than directly between the dome light and ground as is the case with dome light 72. Accordingly, the control circuit shown in FIG. 6 includes a connecting post E which can be connected to such alternative type of dome light circuit, the dome light 172 and operating switch 172' therefor being shown in dotted lines to indicate that it is an alternative connection to the control box unit 48. If this alternative connection is used, the transistor 86 is by-passed, and the charging circuit for the capacitor 92 is completed only when dome light switch 172' is closed whereby current flows from the battery 68, through switch 172', connected E, resistor 110, resistor 90 to charge the capacitor 92 and thereby energize the horn unit 70 as described above. Accordingly, the alarm apparatus of the present invention may be readily used in either type of dome light circuit shown in connection with dome light 72 or dome light 172.

The aforementioned resistor 86 has a resistance (e.g. 10K) selected to cause a voltage drop thereacross high enough to prevent the horn unit 70 from being energized by current flowing through the resistor 84 circuit.

Turning to the second vehicle circuit condition which will cause the horn unit 70 to be energized, it will be noted that contacts C and D are connected to the existing circuits of the vehicle headlamps 76 and ignition coil 78, respectively, and that such contacts C and D are connected to such circuits at points between such respective vehicle components and the operating switches therefor. The operation, insofar as the alarm control circuit is concerned, is identical for each of the connecting points C and D and it is therefore only necessary to describe the operation at connecting point C to also understand the operation of the connecting point D. With the on-off switch 50 at its on position, it will be noted that connecting point C is normally not connected to the voltage of battery 68 because operating switch 76' is open. If however, operating switch 76' is closed (e.g. by a thief), connecting point C is connected directly to the voltage potential at the positive terminal of the battery 68 whereby current flows through the adjacent resistor 98 to raise the emitter voltage of the transistor 94 until it triggers SCR 96 and causes the horn unit 70 to be energized as described above. This energization of the horn unit 70 occurs substantially simultaneously with the closing of operating switch 76' since no delay factor is needed as in the case of the operation of the dome light circuit described above. It will be apparent that if either of the operating switches 76' or 78' are closed, the horn unit 70 will be immediately energized to sound an alarm.

The final circuit condition which will energize the horn unit 70 occurs at contacts F and G which are both normally connected directly to ground through the normally closed reed switch 26 and the usual grounded casing of the tape deck 74, respectively. Again, the operation for both of the connecting points F and G are identical, and an explanation of the circuit operation at connecting point F will also apply to connecting point G. Since connecting point F is normally connected directly to ground through normally closed reed switch 26, a circuit is completed from the battery 68, on-off switch contact 50, adjacent resistor 100, connecting point F, and reed switch 26 to ground, and, again, the adjacent resistor 100 has a resistance (e.g. 10K) which creates a voltage drop that is sufficiently high to prevent the horn unit 70 from being energized. However, if the reed switch 26 is opened, as by a thief opening the closure door 18 in the manner described above, connecting point F is connected to an open circuit and the aforementioned circuit through resistor 100 is no longer shunted to ground, and a circuit therefor extends from resistor 100 through adjacent resistor 102 to raise the emitter voltage of transistor 94 until it triggers SCR 96 and causes the horn unit 70 to be energized as described above. Thus, if the closure door 18 is opened, or if the tape deck 74 is removed from its mounting so as to break its ground connection, the horn unit 70 will be immediately energized to sound an alarm. If for any reason the user of the alarm apparatus elects not to use connecting points F or G, they should be wired directly to grounded connecting point H whereby they will have no further effect on the alarm contact circuit since they are connected to ground.

The alarm circuit shown in FIG. 6 also includes an additional capacitor 104 which suppresses noise in the circuit by presenting a low impedance to ground in connection with the rapidly changing voltages in the base circuit of transistor 94, and a resistor 106 (e.g. 100K) provides high temperature stability for transistor 96 by shunting out base leakage current. Finally, the alarm circuit includes a relatively small resistor 108 (e.g. 100 ohms) that permits the capacitor 92 to discharge therethrough when the on-off switch contact 50' is at its "off" position, whereby if the vehicle owner should inadvertently leave a door open too long upon leaving the vehicle 10 so as to cause the horn unit 70 to be mistakenly energized, such vehicle owner can immediately move the on-off switch 50 to its off position whereupon the capacitor 92 will discharge through resistor 108 and will be again in a condition to create the previously described time delay in the dome light alarm triggered circuit when the on-off switch 50 is again moved on its on position.

It is apparent from the description of the alarm control circuit above that the alarm apparatus of the present invention can be used to sound an alarm when any one of a variety of electrical components associated with a vehicle is operated in a predetermined manner, and that such alarm apparatus is responsive to several distinct and different predetermined conditions within the circuit of such electrical components that would ordinarily occur when a thief attempts to steal the vehicle or to steal components (i.e. the tape deck) or gasoline therefrom. It will be noted, for example, that in the existing dome light circuit, within the vehicle 10, the operating switch 72' is located between the dome light 72 and ground, whereas the operating switch 76' in the existing headlamp circuit is located between the battery 68 and the grounded headlamp 76, yet the alarm apparatus of the present invention may be readily connected to readily accessible points within both such circuits and responds to different operating conditions in such circuits to energize the horn unit 70. Thus, the alarm apparatus of the present invention is fully compatible with varied existing circuits presently found in vehicles, and represents a substantial improvement over prior art alarm apparatus which respond to only one predetermined operating condition which may or may not be found in the existing circuit of any given electrical component in the vehicle.

Although the disclosed embodiment of the present invention includes connections to specific electrical components of the vehicle such as the tape deck 74 and headlamps 76, it is to be understood that the connecting points B, C, D, E, F and G could be connected to the circuits of other electrical components (e.g. trunk light) provided only that such circuits, at the point where the alarm control circuit is connected thereto, will generate the required circuit condition to energize the horn unit 70 in the manner described above.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. For use in a vehicle having a battery connected in circuit with a horn means operated by a normally open horn switch, with a first vehicle accessory component connected by a first existing vehicle circuit directly to ground and having a normally open operating switch connected between said first component and a terminal post of said battery, with a second vehicle accessory component connected by a second existing vehicle circuit directly to said battery terminal and having a normally open operating switch connected between said second component and ground, and with a third vehicle accessory component having a casing thereof connected by a third existing vehicle circuit to ground; the improvement comprising an alarm device having a plurality of connecting points, and a plurality of lead lines formed with selectively attachable means connected, respectively, to said horn means circuit, to said first existing vehicle circuit at a point between said first accessory component and said operating switch therefor, to said second existing vehicle circuit at a point between said second accessory component and said operating switch therefor, and to said third existing vehicle circuit at a point between said third electrical component and grounds, said alarm device including control circuit means operable to close an operating circuit between said battery and said horn in response to a first full voltage circuit condition when said operating switch for said first component is closed, in response to a grounded circuit condition when said operating switch for said second component is closed, or in response to an open circuit condition when said circuit between said third electrical component and ground is broken.

2. An alarm device as defind in claim 1 and further characterized in that said battery is connected by a fourth existing vehicle circuit with a fourth vehicle accessory component connected directly to ground and having a normally open operating switch connected between said fourth component and said terminal post of said battery, in that one of said alarm device connecting points is connected to said fourth existing vehicle circuit at a point between said fourth electrical component and said operating switch therefor, in that said control circuit means acts to complete an operating circuit between said battery and said horn when said operating switch for said fourth electrical component is closed, and in that said control circuit means includes electronic time delay means for delaying said completion of said operating circuit between said battery and said horn for a predetermined time after said operating switch for said fourth electrical component is closed.

3. An alarm device as defined in claim 2 and further characterized in that said time delay means of said control circuit means delays said completion of said operating circuit between said battery and said horn for a predetermined time after said operating switch for said second electrical component is closed.